Dec. 8, 1964  J. M. HOLAHAN  3,160,363
LINE HOLDING MEANS FOR CLOSED FACE SPINNING REEL
Filed Jan. 10, 1962
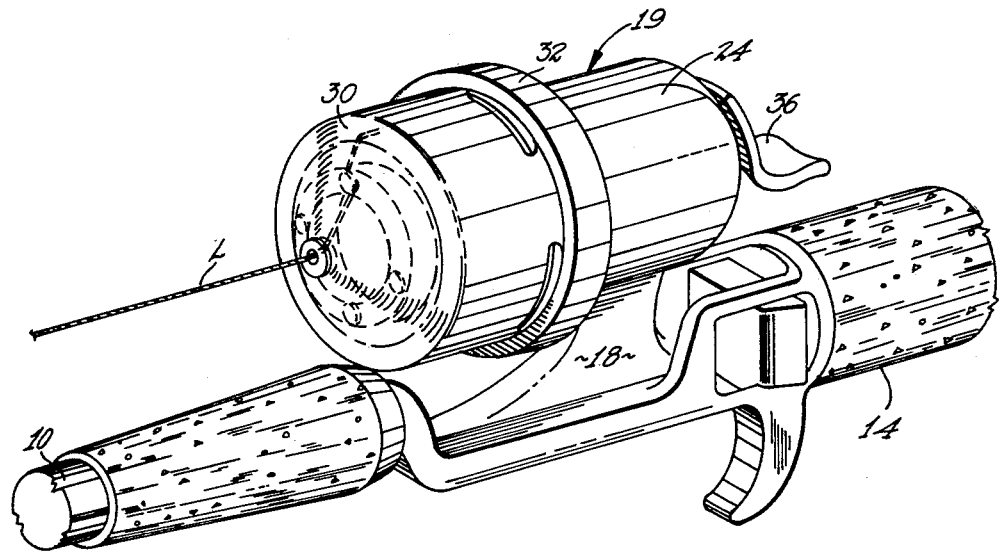
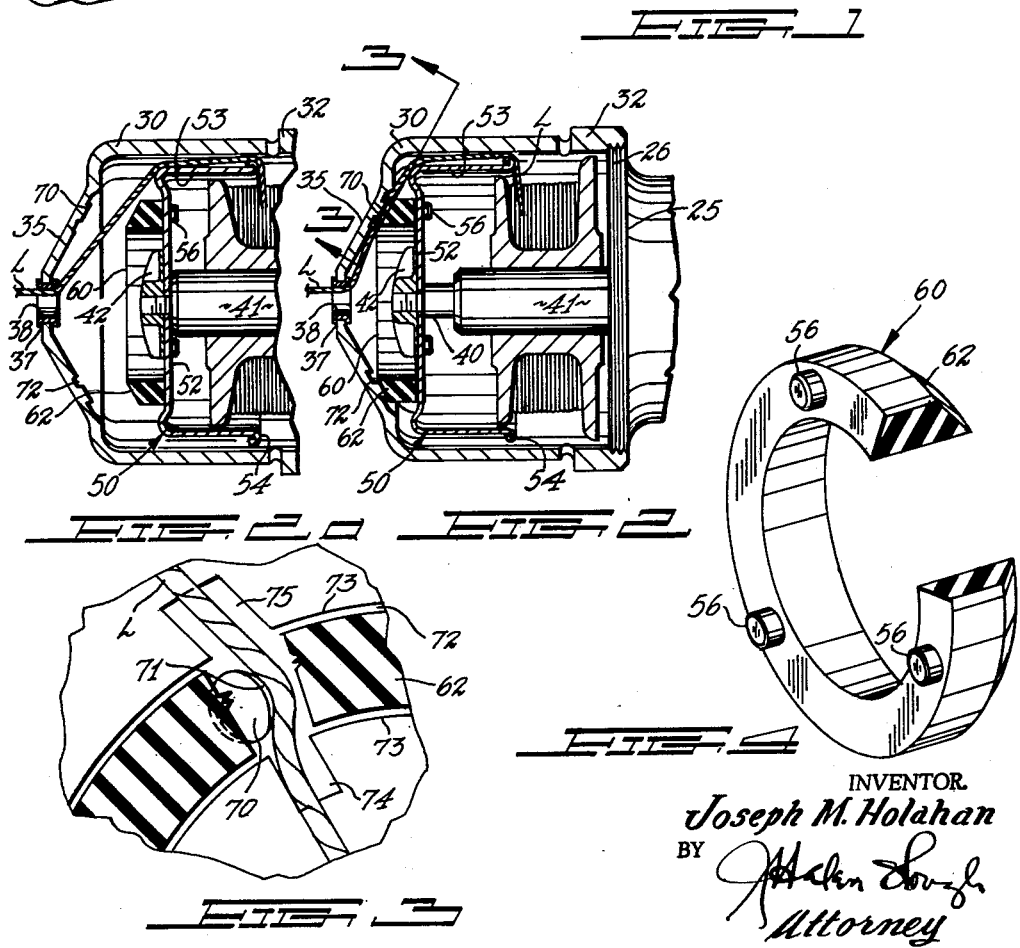
INVENTOR.
Joseph M. Holahan
BY
Attorney 3,160,363
LINE HOLDING MEANS FOR CLOSED
FACE SPINNING REEL
Joseph M. Holahan, Geneva, Ohio, assignor to True Temper Corporation, Cleveland, Ohio, a corporation of Ohio
Filed Jan. 10, 1962, Ser. No. 165,404
11 Claims. (Cl. 242—84.2)

This invention relates in general to fishing reels, and relates more particularly to new and improved means for controlling the fishing line during the casting operation thereof.

The novel line controlling means of my invention enables the line to be controlled in a more desirable manner, that is, by transmitting the force created during the line-holding operation to stationary parts of the fishing reel, thereby eliminating undesirable pressure on the moving parts thereof.

Heretofore, there have been various means provided for clamping or snubbing the line between the inside surface of the shroud or housing and the outer wall of an axially movable winding drum. A common method of snubbing has been to provide the winding drum with a centrally located snubbing member adapted to snub the line adjacent a centrally disposed opening formed in the forwardly disposed portions of the shroud or housing through which the fishing line passes during the casting and retrieving operation. Exemplary of such arrangements are those shown in the patents issued to Rix, Patent No. 2,507,457; Sarah, Patent No. 2,911,165; and Denison et al., Patent No. 2,644,647. It has also been proposed to snub the line between cooperating surfaces of the spooling member and the shroud, said surfaces being located radially outward with respect to the spool. Denison, U.S. Letters Patent No. 2,667,312, illustrates snubbing of the line in such area.

In all the above noted patents and in all other prior art patents in this field with which I am familiar, the snubbing or line-hold arrangement has been such that the torque occasioned by centrifugal force during the cast is transmitted through such snubbing members to the winding drum and such torque or pressure is considerable when heavy sinkers are being used, e.g. sinkers weighing two ounces or more.

Since such winding drums are rotatable and axially reciprocable, gearing is commonly employed to rotate said winding drum. Repeated usage of the snubbing mechanism has a tendency to bind the gearing mechanism due to the above mentioned torque created by the centrifugal force of the sinker and lure, thereby causing malfunctioning of the spinning reel.

It is therefore a primary object of my invention to provide a new and novel line-holding arrangement wherein the centrifugal force created by the sinker and lure is transmitted to the rigid, stationary shroud or housing, and not to the rotatable and axially movable winding drum.

It is a further object of my invention to provide a line-holding structure which permits the line to freely flow outwardly through the opening in the housing immediately upon the withdrawal of the line-holding means associated with the movable winding drum.

These and other objects of my invention will be more readily understood in light of the ensuing specification and accompanying drawings in which:

FIG. 1 is a perspective view of a fishing rod and spinning reel assembly having associated therewith the novel line-holding means of my invention;

FIG. 2 is a vertical cross sectional view through the spinning reel of FIG. 1, showing the novel line-holding means of my invention in line-holding position;

FIG. 2a is a vertical cross sectional view similar to FIG. 2, differing therefrom in that the components of the novel line-holding means are shown in a non-line-holding position;

FIG. 3 is a view taken on lines 3—3 of FIG. 2, illustrating the manner in which the line is held in one operative position between the inside forward surface of the shroud and an annular resilient member associated with the winding drum; and FIG. 4 is a perspective view of the resilient member of FIG. 3 viewed from the rear thereof to more clearly illustrate the mounting means by which the member is secured to the winding drum.

Referring now to the drawings, in which all like numbers indicate like parts, and particularly to FIG. 1, a closed face spinning reel 19 embodying my invention is shown affixed to a fishing rod 10 and handle 14 associated therewith. The reel seat and rod form no essential part of my invention, and thus a more specific reference to the same will be omitted.

The reel of my invention comprises a main housing member 24 generally cylindrical in form and preferably integrally formed with a base member 18 extending therefrom. The main housing member 24 contains the gearing mechanisms and associated structure (not shown) required to transmit movement from a laterally disposed handle means (not shown) to a winding drum positioned outwardly from said main housing 24, as will be more specifically described hereinafter. The main housing member 24 has an enlarged annular flange portion 25, FIG. 2, said flange portion being threaded as shown at 26 on the periphery thereof.

Extending exteriorly of an opening in the rear face of housing 24 is a thumb lever 36, said lever having a forward portion (not shown) adapted to engage an end of the shaft 40 extending within said housing and upon depression of said lever said shaft is axially moved forwardly, or to the left, as viewed in FIG. 2. The manner in which depression of thumb lever 36 causes axial movement of shaft 40 is conventional and forms no part of the instant invention. The lever 36 is resiliently biased in a manner well known in the art and assumes a retracted position upon manual release of the lever 36.

An outer generally cylindrical housing member 30, or shroud, as it is commonly referred to in the art, is provided with an interiorly threaded rearwardly disposed end portion 32 adapted to be threadedly secured onto the exteriorly threaded peripheral flange 26 of the main housing member 24, as shown in FIG. 2. The shroud 30 is provided with an outer cone-shaped forward portion indicated at 35, said forward portion 35 having an opening 37 disposed centrally therein. The opening 37 is adapted to contain a line guide eyelet 38 of conventional nature through which the fishing line L passes. The line L, in a conventional manner is weighted, i.e. it has secured to the end therein a suitable weight, e.g. a sinker, which enables the line to function in the desired manner.

The axially or longitudinally movable shaft 40 which extends into shroud 30, as shown in FIG. 2, is rotatably and axially movably mounted in bushing 41 which preferably is an integral part of the housing 24 extending outwardly therefrom. A preferably stationary spool member 44 is mounted upon the bushing 41 and in the form shown is connected in any suitable manner to the housing whereby spool 44 preferably remains stationary at all times. It will be readily apparent, however, that the line-holding device of my invention could be employed equally as well with a reel provided with a reciprocating spool.

A winding drum generally indicated at 50 is securely mounted on shaft 40 by means of cup nut 42, said winding drum being rotatable and axially movable with shaft 40. The said winding drum 50 is provided with a circular end plate 52 and an annular rearwardly extending flange portion 53, the rearmost portion of the latter preferably terminating in an upwardly bent or rolled, bead-like surface 54 which facilitates withdrawal of the fishing line L delivered from the spool over said flange and through the opening formed by the eyelet 38.

In a manner well known in the art, the winding drum 50 has associated therewith line pick-up means (not shown) which functions to retrieve the line upon rotation of the operating handle and to assist line payout during the casting operation. The line pick-up means can be conventionally constructed in any well known manner and does not form a part of the instant invention and, for purposes of clarity, has not been illustrated.

Referring now to the novel line-holding or clamping means of my invention, a resilient annular line-clamping ring 60 is mounted on the forward face of the end plate 52 of the winding drum 50. The annular ring 60, a rear perspective view of which is shown in FIG. 4, is adapted to be mounted on said end plate 52 by any suitable means, such as, e.g. mounting pins 56 which are adapted to be frictionally received in correspondingly shaped openings in the face 52. Although I have shown three such mounting pins it will be apparent that a different number of pins could be satisfactorily employed. It is also contemplated that suitable adhesive material could be employed to mount the ring 60 on the forward face of the end plate 52.

The front face of the annular clamping ring 60 is preferably provided with a beveled surface 62 which is beveled forwardly at an appropriate angle to contact holding pins 70 provided on the inside surface of the conical face 35 of the shroud 30, in a manner to be specifically described below.

It will thus be readily seen that when shaft 40 and winding drum 50, mounted thereon, are moved axially forwardly, or to the left, as shown in FIG. 2, the beveled surface 62 contacts the holding pins 70 on the inside surface of the front face 35 of the shroud 30.

Referring now to the novel manner in which the line is held or clamped, holding pins 70, the side walls of which contact the line and prevent the same from moving outwardly of the reel, are preferably molded integrally with the shroud 30, thereby forming an integral part thereof. It is, however, contemplated that the holding pins may be separate from the shroud 30 and securely mounted on the inside face of the front face 35 in any suitable manner. I have shown four such holding pins 70, noting FIG. 1, although it will be understood that the particular number employed can be varied. As shown in FIGS. 2 and 3, the beveled front surface 62 of the annular clamping ring 60 is slightly larger in dimension than the inclined surface of the holding pins 70, whereby it is assured that the fishing line L will not contact the top surface of the holding pin 70 during the line-holding operation.

As shown in FIG. 3, the pins 70 are preferably slightly elliptical in shape and are provided with slightly tapered side walls 71. By providing the pins 70 with tapered side walls 71, the fishing line L can quickly, upon the retraction of the winding drum 50, move up the tapered wall 71 and assume the position as shown in FIG. 2a. The tapered walls thus prevent the line from remaining in contact with the pin 70 subsequent to the retraction of the winding drum 50 and the annular clamping ring 60 carried thereby.

In order to further facilitate movement of the line around the pins, an annular recess designated at 72 is formed in the inside surface of the end plate 35, the walls 73 which form said recess being spaced apart a distance slightly greater than the dimension of the beveled surface 62 of the annular clamping ring 60, as clearly shown in FIGS. 2 and 3. The annular recess 72 functions to improve the holding power of the pins 70 and facilitates the flow of the line over the holding pins during that portion of the cast when the annular resilient clamping ring 60 has been withdrawn from its forward position. To further improve the line-holding power of pins 70 and to further facilitate line flow, the recess 72 is preferably provided with generally radially extending recess extensions 74 and 75 located on opposite sides and adjacent each holding pin 70 and extending downwardly and upwardly, respectively, therefrom. As noted in FIG. 3, recess 74 is preferably generally rectangular in shape. Recess 75 is generally parallelogram-shaped, the longitudinal axis thereof extending at an angle, e.g. 30°, to the radial axis.

As shown in FIG. 3, the weighted line, during the line-clamping operation, naturally assumes a position around the pin in the manner illustrated. The line L is delivered from the spool, moving over the flange 53 of the winding drum 50 and through the inclined recess 75, through recess 72, contacting or engaging the side wall of the pin 70, moving around the same, and passing by means of recess 74 out through eyelet opening 37. Thus, in effect, by providing recesses 75 and 74 adjacent each holding pin, the width of the recess 72 is preferably more than doubled whereby there is a greater tendency for the line L to contact the lower portion of the side wall of the pin, thereby improving the contact between the line and the pin 70. This insures that the torque resulting from the centrifugal force hereinbefore described is transferred to the stationary shroud and not to the winding drum.

FIG. 2a shows the annular clamping ring 60 in its retracted position, a position it assumes during that portion of the cast where the line is paid out. It will be noted that in the natural path of the line while being paid out, the line is relatively distant from the pins 70 whereby the tendency of the line L to become inadvertently in contact with the holding pins 70 is substantially precluded. Since the winding drum 50 is also in a retracted position during the line-winding operation, there is likewise little or no tendency for the line to inadvertently contact the holding pins 70 during the line-winding operation following the cast.

In operation, when it is desired to clamp the line, either during the initial portion of the cast in order to prevent undesired line payout, or at the completion of the cast in order to limit the line payout, the thumb lever 36 is depressed, thereby axially moving the shaft 40, winding drum 50, and annular ring 60 forwardly, or to the left, as viewed in FIG. 2. Continued movement forwardly of shaft 40 results in the front annular beveled edge 62 of annular member 60 contacting the holding pins 70 in the manner illustrated in FIG. 2, thereby clamping the line around a pin 70 and preventing line payout in the manner specifically described above. The specific pin contacted will of course depend on the position of the line L at the time thumb lever 36 is depressed to initiate the line-holding operation. As the back cast is made, the thumb is depressed and the centrifugal force of the sinker and lure secured to the end of the fishing line L will cause the weighted line L to assume the position illustrated in FIG. 3 wherein line L is maintained in contact with the side wall of the holding pin 70. The line L will assume this position since the centrifugal force resulting from the weight of the sinker and lure will move the line L to a position in close contact with the inside face 35 of the shroud, the line moving around the face 35 until contact is made with a holding pin 70.

When that portion of the cast is reached where it is desired to release the line thereby paying out the same, the thumb lever 36 is released, whereby shaft 40 is retracted in a conventional manner, generally through a biasing means such as a coil spring associated therewith (not shown). As the shaft 40 is retracted rearwardly, or to the right as shown in FIG. 2, the annular ring 60 rigidly secured thereto will likewise be retracted thereby moving the front beveled face 62 thereof away from the holding pin 70. The line L is then immediately freed, moving outwardly, as shown in FIG. 2a, thereby completing the cast. Since there is no torque transmitted to the winding drum when the line is held, the winding drum, and annular ring 60 carried thereby, will always be retracted immediately upon the release of pressure upon the thumb lever 36.

It will thus be seen that during the line-holding operation, wherein the beveled surface 62 of annular ring 60 is in contact with the holding pins 70, the torque resulting from the centrifugal force of the fishing line L, due to the weight of the sinker and lure attached to the end thereof, is transferred to the side wall of the holding pin 70. This torque is thereupon transmitted from the holding pin 70 through the shroud housing 30, preferably integral therewith, to the main housing 24, all of which members are stationary and capable of readily absorbing the torque created by the centrifugal force of the line, sinker, and lure. In this manner, the torque is prevented from being transmitted to the rotatable and axially movable winding drum. Therefore, undesirable binding, previously present in prior art devices, by repeated operation of the snubbing mechanism, is substantially entirely eliminated, thus eliminating malfunctioning of the gear mechanism due to such binding. This shifting of the torque created by the centrifugal force, as described above, to the stationary shroud member, instead of to the rotatable and axially movable winding drum, as in prior art devices, is particularly important where heavy sinkers are being employed, e.g. sinkers having a weight of two ounces or more.

It will thus be seen that I have accomplished the objects of my invention. I have provided a line-holding means wherein torque created by the centrifugal force of the sinker and lure during line-holding is transmitted to the stationary shroud and the main housing of the reel and absorbed or dampened thereby. Further, the annular clamping ring is immediately withdrawn subsequent to release of pressure on the thumb lever.

What I claim as my invention is:

1. In a fishing reel of the character described, a stationary housing member, spool means positioned within said housing member, said housing member having a centrally located opening therein through which a fishing line may pass off the end of the spool means, shaft means mounted within said spool means, a line-winding member mounted on said shaft, a line-clamping member secured to said line-winding member, line-contacting pin means provided on the inside face of said housing member adjacent said opening, control means for axially moving said line-clamping member in contact with said line-contacting means to transmit torque to said line-contacting means and said stationary housing member.

2. In a fishing reel of the character described, a stationary housing member, spool means positioned within said housing member, said housing member having a centrally located opening therein through which a fishing line may pass off the end of the spool means, shaft means mounted in said spool means, a line-winding member mounted on said shaft, a line-clamping member mounted on said line-winding member, line-contacting pin means provided on the inside face of said housing member adjacent said opening and being formed integral therewith, control means for axially moving said line-clamping member in contact with said line-contacting means and thereby clamp said line around said line-contacting member to transmit torque to said line-contacting means and said stationary housing member.

3. In a fishing reel of the character described having a weighted line associated therewith, a stationary housing member, spool means positioned within said housing member, said housing member having a centrally located opening therein through which a fishing line may pass off the end of the spool means, shaft means mounted within said spool means for rotatable and reciprocable movement relative thereto, a line-winding member mounted on said shaft for rotatable and reciprocable movement therewith, a line-clamping member secured to said line-winding member, line-contacting pin means provided on the inside face of said housing member adjacent said opening, control means for axially moving said line-clamping member in contact with said line-contacting means whereby torque resulting from the centrifugal force of said weighted line is transmitted to said line-contacting means and said stationary housing member.

4. In a fishing reel of the character described adapted to have associated therewith a fishing line, a main housing, a shroud connected to said housing, spool means positioned within said shroud, said shroud having a centrally located opening therein through which a fishing line may pass off the end of the spool, shaft means mounted in said spool means, a line-winding member mounted on said shaft, a resilient annular clamping ring mounted on said line-winding member, at least one pin means provided on the inside face of said shroud, said annular ring adapted to contact said pin means and thereby clamp said line around said pin means, whereby the torque resulting from the centrifugal force of said line is transmitted to said pin means and said stationary housing member.

5. In a fishing reel of the character described adapted to have associated therewith a fishing line, a main housing, a shroud connected to said housing, said shroud including a conical shaped front portion, said front portion having a centrally located opening through which a fishing line may pass, the inside face of said conical portion of said shroud having a plurality of spaced line-holding pins to transmit force from said line to said shroud and said housing.

6. The combination of claim 5 further including an annular recess formed on the inside face of said conical shaped front portion of said shroud, said pins being integrally formed on said shroud and being within said annular recess.

7. The combination of claim 6 further including radially extending recesses formed in the inside face of said conical shaped front portion of said shroud adjacent said pins, said recesses extending above and below said pins and in a direction generally perpendicular to said annular recess.

8. The combination of claim 5 wherein said pins are generally elliptical in shape and are provided with tapered, longitudinally extending side walls.

9. In a fishing reel of the character described adapted to have a fishing line associated therewith, a main housing, a shroud connected to said housing, said front portion having a central opening therein through which a fishing line may pass, spool means positioned within said shroud, shaft means mounted in said spool means, a line-winding member mounted on the forward end of said shaft, an annular clamping ring mounted on the front face of said line-winding member, a plurality of pin means integrally formed on the inside face of said shroud, said annular ring adapted to contact said pins and thereby clamp said line around one of said pins, whereby the torque resulting from the centrifugal force of said line is transmitted to said pin and said shroud.

10. The combination of claim 4 wherein said pins and said annular ring have flat contacting surfaces, the width of said annular ring being slightly greater than the longest dimension of said contact surface of said pin.

11. The combination of claim 9 wherein the inside face of said shroud is provided with recesses surrounding each of said pins, said recesses functioning to increase contact between said line and said pin.

References Cited in the file of this patent

UNITED STATES PATENTS

| 2,644,647 | Denison et al. | July 7, 1953 |

FOREIGN PATENTS

| 859,107 | Great Britain | Jan. 18, 1961 |
| 168,921 | Sweden | Oct. 13, 1959 |